(12) United States Patent
Ehrismann et al.

(10) Patent No.: US 12,138,760 B2
(45) Date of Patent: Nov. 12, 2024

(54) DEVICE FOR HOLDING A CONTAINER AND CONTAINER TREATMENT DEVICE

(71) Applicant: KRONES AG, Neutraubling (DE)

(72) Inventors: Tobias Ehrismann, Neutraubling (DE); Bruno Landler, Neutraubling (DE); Markus Schoenfelder, Neutraubling (DE)

(73) Assignee: KRONES AG, Neutraubling (DE)

( * ) Notice: Subject to any disclaimer, the term of this patent is extended or adjusted under 35 U.S.C. 154(b) by 485 days.

(21) Appl. No.: 17/337,673

(22) Filed: Jun. 3, 2021

(65) Prior Publication Data
US 2021/0379733 A1 Dec. 9, 2021

(30) Foreign Application Priority Data
Jun. 4, 2020 (DE) ...................... 10 2020 114 905.0

(51) Int. Cl.
*B25B 5/04* (2006.01)
(52) U.S. Cl.
CPC ...................................... *B25B 5/04* (2013.01)
(58) Field of Classification Search
None
See application file for complete search history.

(56) References Cited

U.S. PATENT DOCUMENTS

| 3,868,009 A | 2/1975 | Billi et al. | |
| 5,711,411 A * | 1/1998 | Zurweller | B67C 3/242 198/470.1 |
| 6,513,643 B2 * | 2/2003 | Nakada | B07C 5/122 198/379 |
| 6,938,753 B2 * | 9/2005 | Bonatti | B65G 47/847 198/470.1 |
| 2002/0017075 A1 * | 2/2002 | Resterhouse | B65B 7/2807 53/287 |
| 2003/0197391 A1 * | 10/2003 | Graffin | B67B 3/206 294/104 |

(Continued)

FOREIGN PATENT DOCUMENTS

| DE | 44 24 077 A1 | 1/1996 |
| DE | 10 2009 043 984 A1 | 3/2011 |

(Continued)

OTHER PUBLICATIONS

Extended European Search Report dated Oct. 29, 2021 from corresponding European application No. 21177690.1, 9 pages.

(Continued)

*Primary Examiner* — Bryan R Muller
*Assistant Examiner* — Dana Lee Poon
(74) *Attorney, Agent, or Firm* — .Haynes and Boone, LLP (57) ABSTRACT

A device for holding a container in a container treatment device, for example for holding a beverage container in a neck portion or in a trunk portion, includes two gripping arms which are pivotable relative to one another in a pivoting plane and which in each case have a holding portion for holding the container to be held, and a lifting rod which is coupled to the gripping arms such that the holding portions are pivotable relative to one another by a displacement of the lifting rod perpendicular to the pivoting plane of the gripping arms. A container treatment device, provided with such a device, is also described.

19 Claims, 8 Drawing Sheets

(56) References Cited

U.S. PATENT DOCUMENTS

| | | | | |
|---|---|---|---|---|
| 2010/0212259 A1* | 8/2010 | Knieling | ............... | B65B 55/00 |
| | | | | 53/285 |
| 2010/0289287 A1* | 11/2010 | Preti | ................... | B65G 47/847 |
| | | | | 294/116 |
| 2012/0017539 A1* | 1/2012 | Neufeld | ................ | H02K 41/02 |
| | | | | 310/12.14 |
| 2012/0085068 A1 | 4/2012 | Cirio | | |
| 2016/0214803 A1* | 7/2016 | Armellin | ................ | B29C 49/36 |
| 2019/0084776 A1* | 3/2019 | Fahldieck | ............. | B65G 47/90 |
| 2019/0176343 A1* | 6/2019 | Landler | ............... | B25J 15/0226 |

FOREIGN PATENT DOCUMENTS

| | | |
|---|---|---|
| DE | 10 2010 049 026 A1 | 6/2012 |
| DE | 10 2012 218 204 A1 | 4/2014 |
| DE | 10 2012112 946 A1 | 6/2014 |
| DE | 10 2015 115 729 A1 | 3/2017 |
| DE | 10 2015 224 973 A1 | 6/2017 |
| DE | 10 2015 106 759 B4 | 12/2018 |
| DE | 10 2019 113 653 A1 | 11/2020 |
| EP | 3 546 397 A1 | 10/2019 |
| JP | 2007 238121 A | 9/2007 |
| WO | WO 01/92109 A1 | 12/2001 |
| WO | WO 2009/135597 A1 | 11/2009 |

OTHER PUBLICATIONS

German Office Action dated Mar. 9, 2021 for German Application No. DE 10 2020 114 905.0, 6 pages.

* cited by examiner

DEVICE FOR HOLDING A CONTAINER AND CONTAINER TREATMENT DEVICE

CROSS-REFERENCE TO RELATED APPLICATIONS

This application claims priority from German Patent Application No. DE 10 2020 114 905.0, filed on Jun. 4, 2020 in the German Patent and Trademark Office, the disclosure of which is incorporated herein by reference in its entirety.

BACKGROUND

Technical Field

The present invention relates to a device for holding a container in a container treatment device, for example for holding a beverage container in a neck portion or in a trunk portion in a container closing device.

Related Art

In beverage filling systems it is known to hold the containers which are respectively to be filled and/or the containers which are already filled by means of devices for holding a container and to transport said containers in this manner through the individual treatment stations of the container treatment device. In this case, different devices are known for holding the respective container, the containers which are respectively to be treated being held in different ways by said devices.

Thus, for example, passive devices and/or passive clamps for holding a container are known, said passive devices and/or passive clamps being resiliently pretensioned, simply by inserting the respective container into the device for holding the container, and then holding the respective container. Such a clamp for gripping containers is disclosed in DE 10 2012 218 204 A1. In this case, the clamp has a fixed position. For gripping a container, said container has to be pushed into the clamp. In this case, the rigid gripping arms are spread apart outwardly so that the container has to be moved counter to the closing force of the gripping arms, which is produced due to the clamp being spread apart. As a result, the container is subjected to a high degree of force when inserted so that such holding devices are not suitable for gripping and/or holding more fragile and/or easily deformable and thin-walled containers. Moreover, there is a tendency for the surfaces of the respective containers to be scratched, so that the quality of the containers may be reduced.

Also known are active devices and/or active clamps for holding a container in which an opening and closing of the respective holding portions of the device for holding a container is actively carried out by means of an actuator. Such active devices for holding a container serve, in particular, to permit a secure and gentle transfer of the respective containers from an upstream device for holding a container or to ensure a similarly secure transfer of the containers, which acts in a gentle manner on the containers, to a downstream device for holding a container. In particular, by the active opening and closing of the respective device for holding a container, greater friction on the respective container, which could lead to the container being scratched, for example, may be avoided and, on the other hand, a predetermined holding force and/or clamping force, which may be kept within a predetermined tolerance range of the container dimension, may be adjusted. Such active devices for holding a container are made up of a plurality of individual parts, for example clamp arms, bushings, spring elements, pretensioning elements and corresponding connecting elements for securely connecting the aforementioned parts, as well as activation elements for controlling the position of the clamp arms and/or the holding portions, for example actuators, rollers or teeth. Devices which are constructed in this manner for holding a container are thus complicated to clean and require a correspondingly high degree of production effort. Such devices for holding a container are disclosed, for example, in US 2012/085068 A1 or DE 10 2009 043 984 A1.

In beverage filling systems, the filled products are often sensitive relative to contaminants so that, for example, the filling of the containers or the closing of the containers by means of a container closure is carried out in a special atmosphere which is provided, for example, by a clean room or isolator.

In order to reduce the cleaning effort it is known to arrange the control unit, by which the position of the clamp arms is controlled and/or predetermined, outside a clean room, as may be derived, for example, from DE 10 2010 049 026 A1 or DE 10 2012112 946 A1. Accordingly, due to the arrangement of the control unit radially inside the device for holding a container, relative to a rotational axis of the transport device, a relatively large amount of constructional space of the transport device is necessarily required in the radial direction.

SUMMARY

An improved device for holding a container in a container treatment device, for example for holding a beverage container in a neck portion or in a trunk portion in a container closing device, as well as a corresponding method, are described herein according to various embodiments.

A device for holding a container in a container treatment device, for example for holding a beverage container in a neck portion or in a trunk portion in a container closing device is disclosed in the description and the figures.

A device for holding a container in a container treatment device, for example for holding a beverage container in the neck portion thereof or in the trunk portion thereof, is described herein, said device comprising two gripping arms which are pivotable relative to one another in a pivoting plane and which in each case have a holding portion for holding the container to be held. The device further comprises a lifting rod which is coupled to the gripping arms such that the holding portions are pivotable relative to one another by a displacement of the lifting rod perpendicular to the pivoting plane of the gripping arms.

Since the device comprises a lifting rod, which is coupled to the gripping arms such that the holding portions are pivotable relative to one another by a displacement of the lifting rod perpendicular to the pivoting plane of the gripping arms, it is possible for a minimum constructional space in the radial direction of a container transport device to be smaller relative to conventional devices. Instead of an activation means from the radially inward direction, the activation means of the clamp arms of the device for holding a container may be arranged above or below relative to the pivoting plane. In principle, unlimited constructional space is present here. As a result, it is possible in turn to attach the device for holding a container closer to a rotational axis of the transport device.

Additionally, a seal may be constructed in a simpler manner between the displaceable lifting rod and a housing of a container treatment device than in the case of pivoting and/or rotating activation elements, in particular a static seal may be implemented on the lifting rod and on the housing.

Moreover, the activation means and/or a control unit may be placed in a simple manner in a region in which a contamination by the filling product is less likely or occurs to a lesser degree. In other words, the activation means or the control unit may also be arranged outside a clean room.

The lifting rod is generally configured to be displaceable in the direction of its longitudinal axis.

It has been shown to be particularly advantageous if the lifting rod is oriented relative to its longitudinal axis perpendicular to the pivoting plane.

Accordingly, for converting the displacement of the lifting rod into a pivoting movement of the holding regions relative to one another, a coupling arrangement is generally arranged between the gripping arms and the lifting rod, said coupling arrangement converting the displacement of the lifting rod into the pivoting of the holding regions relative to one another.

According to an embodiment, the gripping arms are pivotably arranged about a common pivot axis. Alternatively, the gripping arms may have in each case a separate pivot axis about which they are pivotably arranged.

Moreover, it is possible for the gripping arms to be pivoted relative to one another by a displacement of the gripping arms in the pivoting plane, generally a displacement and a pivoting of the gripping arms relative to one another takes place without the gripping arms having a fixed pivot axis.

For the movement of the holding portions relative to one another, it is also possible for simply one of the gripping arms to be moved and the other gripping arm to be configured to be stationary.

A particularly accurate control of the position of the gripping arms, and at the same time providing a construction of the device for holding a container which is simple to clean, may be achieved if at least one gripping arm comprises a pivoting lever which is fixedly connected to the gripping arm and which is coupled via a coupling member to the lifting rod.

Generally, the two gripping arms have in each case a pivoting lever which is respectively coupled via a coupling member to the lifting rod, or the gripping arms are rotatably coupled to one another, typically via two intermeshing gears.

According to a further embodiment, the coupling member is rotatably arranged on the lifting rod, wherein a rotational axis of the coupling member is typically oriented on the coupling member perpendicular to the longitudinal axis of the lifting rod.

Alternatively or additionally, the pivoting lever in its longitudinal direction may be displaceably received on the coupling member.

Moreover, it has been shown to be advantageous if the pivoting lever is received on the coupling member in a rotatable manner relative to the coupling member and/or with play.

In order to be able to adjust the position of the gripping arms, the coupling member may have an adjusting element, for example an eccentric element, for adjusting the pivoting position of the gripping arm.

According to a further embodiment, the lifting rod comprises a slide element, wherein the at least one coupling member is coupled via the slide element to the lifting rod.

According to a development, relative to the longitudinal axis the coupling member may be coupled on one side to the slide element and the coupling member may be coupled on the other side to the pivoting lever.

It has been shown that a simple and stable construction of the device for holding a container may be achieved when the slide element is of S-shaped configuration and is connected at a central portion to the lifting rod.

According to a further embodiment, relative to an orientation of a container which is held by the gripping arms in the device for holding a container, the coupling of the coupling member to the lifting rod is arranged in the direction of the longitudinal axis above the coupling of the coupling member to the pivoting lever. If the pivoting lever extends relative to the pivot axis on the side of the holding portion, by a displacement of the lifting rod in the direction of the gripping arms, in other words by a displacement of the lifting rod downwardly relative to the orientation of the device for holding a container, an opening of the gripping arms, thus a pivoting of the holding portions of the gripping arms away from one another, may be permitted. Accordingly, by lifting the lifting rod, thus a displacement of the lifting rod upwardly, a closing of the holding portions, in which the holding portions are pivoted in opposing directions toward one another, may be achieved.

If the pivoting lever extends relative to the pivot axis on a side opposing the holding portion, namely a rear face of the device, by a displacement of the lifting rod in the direction of the gripping arms, in other words by a displacement of the lifting rod downwardly relative to the orientation of the device for holding a container, a closing of the gripping arms, thus a pivoting of the holding portions of the gripping arms toward one another, may be permitted. Accordingly, by lifting the lifting rod, thus a displacement of the lifting rod upwardly, an opening of the holding portions, in which the holding portions are pivoted in opposing directions away from one another, may be achieved.

Alternatively, the coupling of the coupling member to the lifting rod may be arranged in the direction of the longitudinal axis below the coupling of the coupling member to the pivoting lever. As a result, by a displacement of the lifting rod in the direction of the gripping arms, in other words by a displacement of the lifting rod downwardly relative to the orientation of the device for holding a container, it is possible to achieve an opening of the gripping arms, in which the holding portions are pivoted in opposing directions away from one another, when the pivoting lever is arranged on the side of the holding portion. A closing takes place when the pivoting lever extends on the side opposing the holding portion. Accordingly, by lifting the lifting rod, thus a displacement of the lifting rod upwardly, a closing of the holding portions, thus a pivoting of the holding portions of the gripping arms toward one another, may be achieved when the pivoting lever is arranged on the side of the holding portion, and a closing may be achieved when the pivoting lever extends on the side opposing the holding portion.

As a result, according to a further embodiment, the coupling may be arranged between the at least one pivoting lever and the at least one coupling member relative to the pivot axis on a side opposing the holding portion, or the coupling may be arranged between the at least one pivoting lever and the at least one coupling member relative to the pivot axis on the side of the holding portion.

According to a further embodiment, the lifting rod on its side opposing the gripping arms has a control unit for controlling the position of the lifting rod relative to the longitudinal axis. The control unit may be provided in a region in which it has a low risk of being contaminated by filling product. In particular, as a result it is possible to arrange the control unit outside a housing which encloses the gripping arms of the device for holding a container.

In order to hold the holding portions of the gripping arms in a predetermined position, for example a closed position of the holding portions or an open position of the holding portions, the control unit may comprise a pretensioning element, for example a spring, for pretensioning the lifting rod into a predetermined position.

Alternatively or additionally, the lifting rod may comprise an interaction portion for interacting with a predetermining device for predetermining the position of the lifting rod, wherein the interaction element is generally configured in the form of a slide element, a pin and/or a wheel and is typically configured for sliding and/or rolling on a predetermining device configured as a guide curve or guide groove.

According to a further embodiment, the lifting rod comprises two rod elements which are displaceable relative to one another in the direction of the longitudinal axis, wherein the rod elements are coupled via a spring element in the direction of the longitudinal axis. As a result, it is possible to provide a holding force which is produced according to the spring path of the spring element and by which the container is held in the holding portions. The holding force in this case results from an overtravel of the rod elements relative to one another, wherein the overtravel represents the spring path of the spring element.

According to a further embodiment, the lifting rod comprises a seal for sealing the lifting rod relative to a housing opening of a housing of the container treatment device, the lifting rod extending through said housing opening. Thus it is possible to arrange the gripping arms inside the housing, wherein generally a special atmosphere, in particular an atmosphere with a reduced bacterial count, for example corresponding to a clean room, may be provided in the interior of the housing, the container held by the gripping arms being able to be treated therein, and a control unit may be arranged outside the housing.

In certain embodiments, the seal is fastened to the lifting rod. Alternatively or additionally, the seal may be configured to be fastened to the housing opening.

The seal is generally configured to compensate for a travel of the lifting rod required for pivoting the gripping arms during operation, wherein the seal typically comprises a silicone material and/or is configured as a folding bellows.

"Fastened" in this sense is understood to mean a static fastening, in which a relative movement between the lifting rod and seal and/or between the housing and seal is not present and/or possible.

According to a further embodiment, the coupling housing encloses the at least one coupling member and the at least one pivoting lever, wherein generally the lifting rod extends through a generally sealed opening in the coupling housing and the gripping arms are fastened in each case to a shaft which is pivotable about the pivot axis of the gripping arm, wherein the shafts extend through a typically sealed bore in the coupling housing. As a result, the region of the coupling between the lifting rod and the gripping arms, in particular the region in which the coupling member is coupled to the lifting rod, the region in which the coupling member is coupled to the pivoting lever, and a bearing of the shafts on a mount, may be protected by the coupling housing from contamination, for example by filling product.

A container treatment device, according to various embodiments, is also disclosed in the present description and the figures.

Accordingly, a container treatment device, for example for closing a container with a container closure, is disclosed, said container treatment device comprising a transport device for transporting containers. The container treatment device is characterized in that the transport device has a device for holding a container according to one of the preceding embodiments.

Since the transport device has a device for holding a container according to one of the preceding embodiments, the advantages and effects described relative to the device are also equally relevant to the container treatment device.

According to an embodiment, the container treatment device comprises a housing for providing a sealed space, wherein the gripping arms are arranged in the interior of the housing and the lifting rod extends through a housing opening, wherein the control unit is arranged outside the housing, for example above the housing opening.

In some embodiments, the housing opening is sealed by an above-described seal being provided between the housing opening and the lifting rod.

BRIEF DESCRIPTION OF THE FIGURES

Further embodiments of the invention are described in more detail by the following description of the figures.

DETAILED DESCRIPTION

Exemplary embodiments are described hereinafter with reference to the figures. In this case, elements which are the same, similar or have the same function are provided in the various figures with identical reference numerals and a repeated description of these elements is in some cases omitted in order to avoid redundancies.

Figure 1:
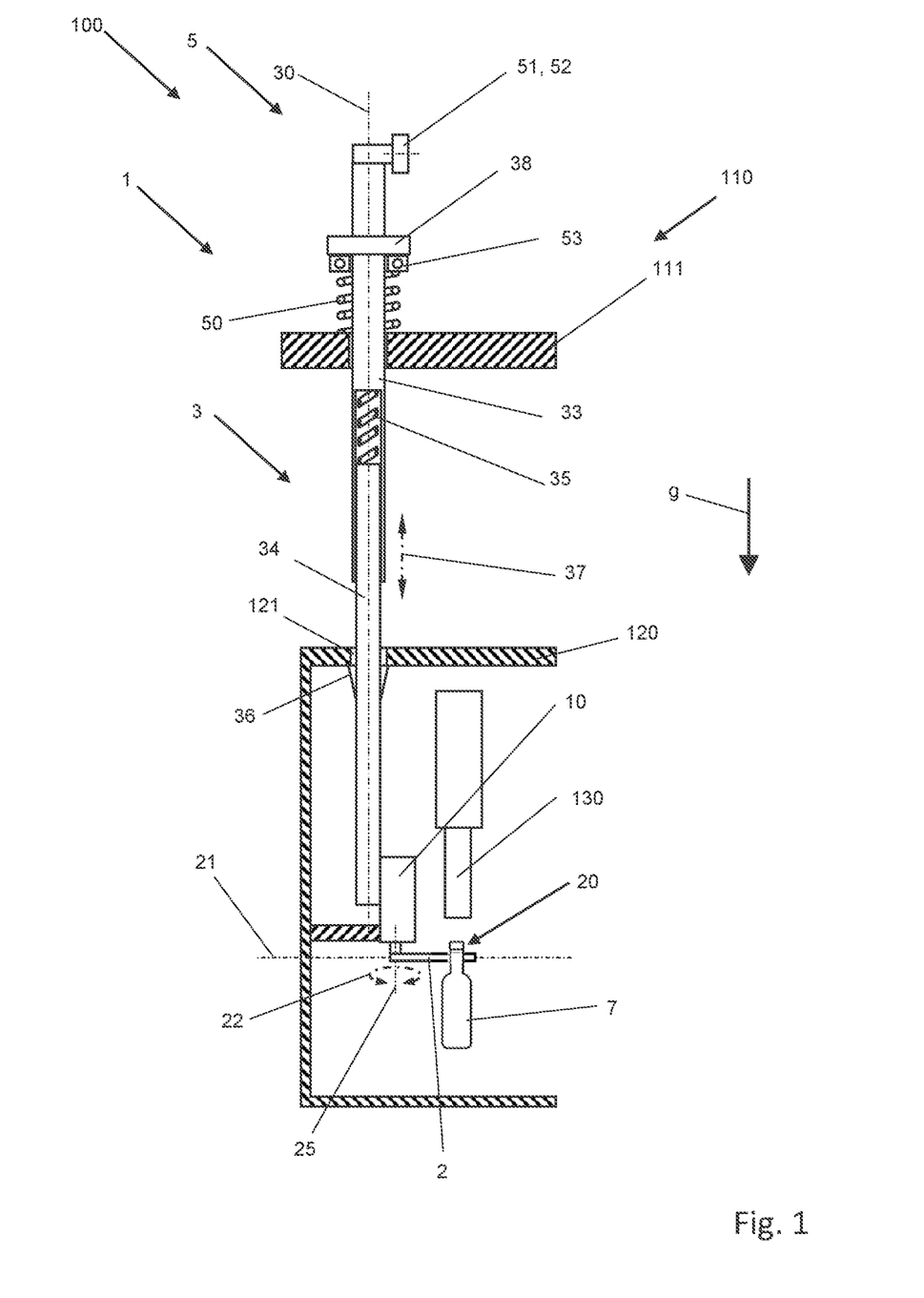
FIG. 1 shows schematically a side view of a container treatment device.

Shown schematically in FIG. 1 is a side view of a container treatment device 100 which comprises a transport device 110 for transporting containers 7, a treatment device 130, in the present case in the form of a closing device for closing a container 7 with a container closure (not shown), and a housing 120 which at least partially encloses the treatment device 130. The housing 120 may be, for example, an isolator which serves to form an atmosphere in the interior thereof which is shielded relative to the surroundings.

The transport device 110 has a device 1 for holding a container 7 which comprises two gripping arms 2 which are pivotable relative to one another in a pivoting plane 21 and which in each case have a holding portion 20 for holding the container 7 to be held, in the present case in a neck portion of the container 7.

The device 1 further comprises a lifting rod 3 which is coupled to the gripping arms 2 such that the holding portions 20 are pivotable relative to one another by a displacement of the lifting rod 3 perpendicular to the pivoting plane 21. In FIG. 1 the displacement of the lifting rod 3 is indicated by means of the reference numeral 37 and the pivoting of the gripping arm 2 is indicated by means of the reference numeral 20.

The lifting rod 3 extends along its longitudinal axis 30. In the present case, relative to its longitudinal axis 30 the lifting rod 3 is oriented perpendicular to the pivoting plane 21.

A coupling arrangement 10, which is designed to convert a displacement of the lifting rod 3 perpendicular to the pivoting plane 21 into a pivoting of the gripping arms 2 relative to one another, is arranged between the lifting rod 3 and the gripping arms 2.

The lifting rod 3 comprises a control unit 5 for controlling the position of the lifting rod 3 relative to the longitudinal axis 30. The control unit 5 comprises a pretensioning element 50, in the present case in the form of a spiral spring, which is supported on one side on a projection 38 of the lifting rod 3 and on the other side on a carrier 111 of the transport device 110.

A rolling bearing 53 for rotationally decoupling the pretensioning element 50 and the projection 38 is arranged between the projection 38 and the end of the spiral spring supported thereon.

By means of the pretensioning element 50 the lifting rod 3 is pretensioned into an upper end position, viewed in the direction of the longitudinal axis 30, which corresponds in the present case to the direction of gravity g.

The control unit 5 further comprises an interaction portion 51, in the present case in the form of a wheel 52, which may roll over a guide curve (not shown). In the upper end position of the lifting rod 3 the gripping arms 2 and thus the holding portions 20 are in an open position.

In order to move the gripping arms 2 and thus the holding portions 20 into a closed position for holding the container 7 to be held, the lifting rod 3 is moved counter to the pretensioning of the pretensioning element 50 perpendicular to the pivoting plane 21 in the direction of the gripping arms 2. The displacement 37 of the lifting rod in the direction of gravity g is translated by the coupling arrangement 10 into the pivoting movement 22 of the gripping arms 2.

The lifting rod 3 comprises two rod elements 33, 34 which are displaceable relative to one another in the direction of the longitudinal axis 30 and which are coupled via a spring element 35 in the direction of the longitudinal axis. Accordingly, a closing force may be provided on the holding portions 20 via the spring element 35 and an overtravel of the upper rod element 33.

The overtravel of the rod element 33, thus the path which the rod element 33, predetermined via the wheel 52, additionally covers after the gripping arms 2 are located in the closed position due to the displacement of the lifting element 3 in the direction of the gripping arms 2, in this case corresponds to a spring path of the spring element 35, a compressive force being transmitted thereby to the lower rod element 34 corresponding to the spring stiffness of the spring element 35. This compressive force is transmitted to the gripping arms 2 via the coupling arrangement 10 so that the gripping arms 2 press against their holding portions 20 with a corresponding closing force in the direction of the container 7 to be held.

Alternatively, the lifting rod may also be coupled to the gripping arms such that the lifting rod 3 is lifted counter to the direction of gravity g. Accordingly, therefore, the pretensioning element 35 may be designed as a tension spring.

The gripping arms 2 of the device 1 are arranged inside the sealed space provided by the housing 120. The lifting rod 3 extends through a housing opening 121, wherein the control unit 5 is arranged outside the housing 120, in the present case above the housing 120.

The lifting rod 3 comprises a seal 36, the lifting rod 3 being sealed thereby relative to the housing opening 121. In the present case, the seal 36 is fixedly fastened to the lifting rod 3 and also fixedly fastened to the housing opening 121 and/or the housing 120. The seal 36 is configured such that a travel of the lifting rod 3 required during operation may be compensated by the seal 36. In the present case, the seal 36 comprises a silicone material and is configured in the form of a folding bellows.

Alternatively, the seal 36 may also be configured in the form of a hollow cylinder.

Figure 2:
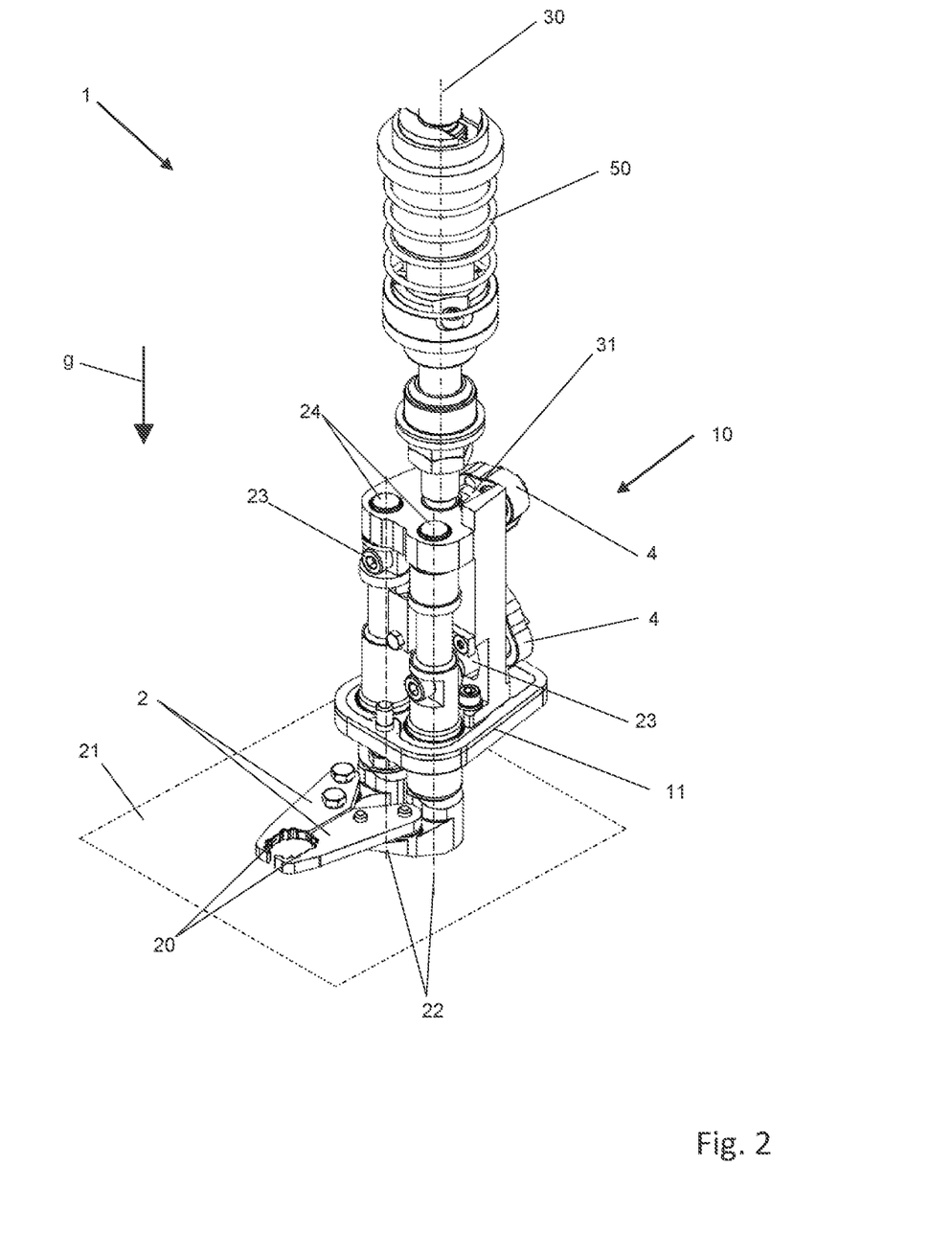
FIG. 2 shows schematically a perspective side view of a device for holding a container.
Figure 3:
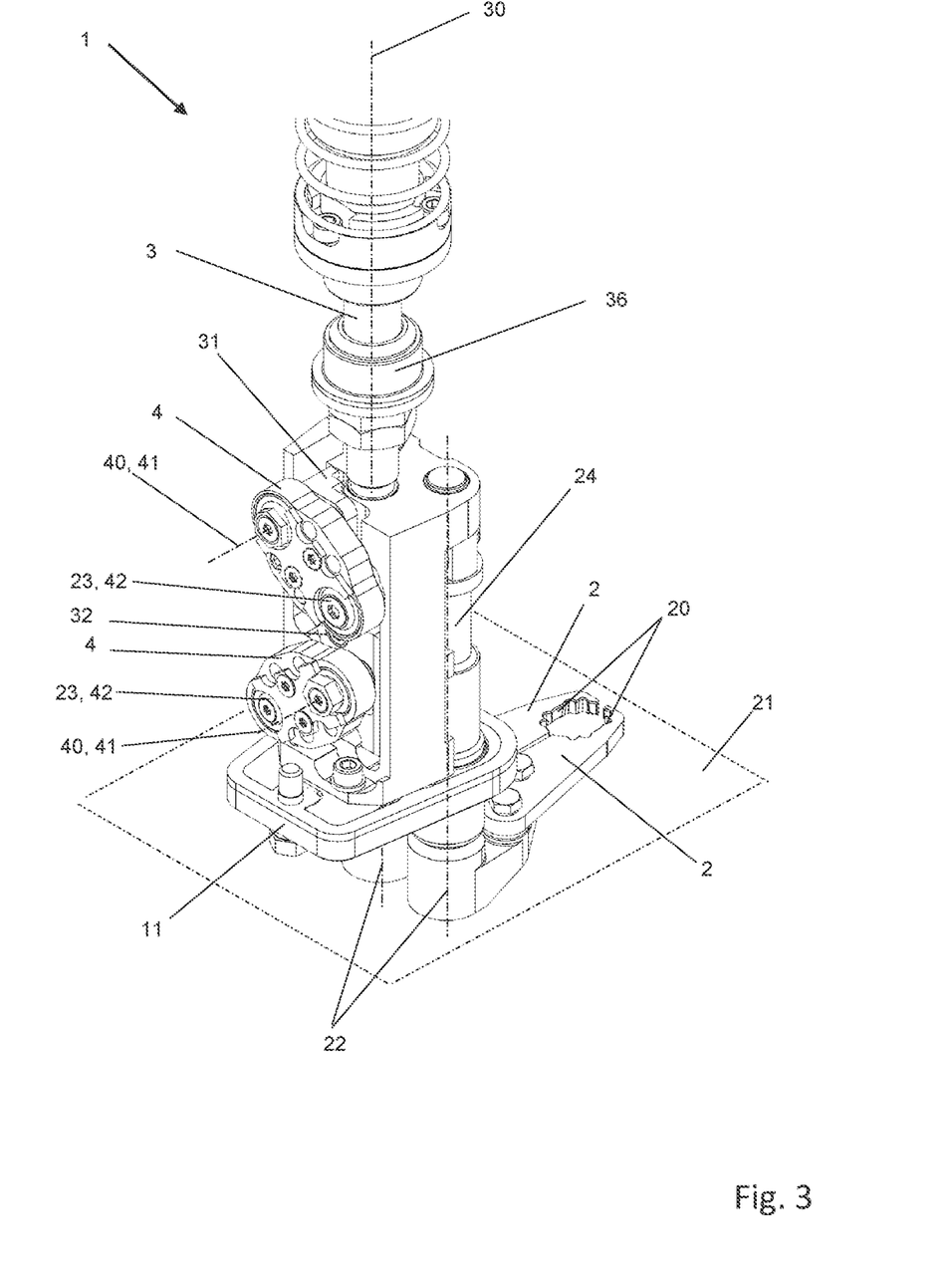
FIG. 3 shows schematically a perspective rear view of the device of FIG. 2.

FIGS. 2 and 3 show schematically a perspective side view and a perspective rear view of a device 1 for holding a container as may be contained, for example, in the container treatment device 100 according to FIG. 1.

As already described relative to FIG. 1, the device 1 comprises two gripping arms 2, which are pivotable relative to one another in the pivoting plane 21, and the lifting rod 3.

The gripping arms 2 are pivotably arranged on a mount 11, in each case about a pivot axis 22 which is oriented parallel to the longitudinal axis 30 and which is configured via a mechanical shaft 24. Each gripping arm 2 further comprises a pivoting lever 23 which is arranged on the shaft 24 and which extends perpendicular to the pivot axis 22, relative to the pivot axis 22, on the side opposing the holding portion 20. The pivoting lever 23 in this case is connected fixedly in terms of rotation to the gripping arm 2.

The lifting rod 3 comprises an S-shaped slide element 31 which is rigidly fastened to the lifting rod 3 in a central portion 32 of the slide element 31.

Each pivoting lever 23 is coupled in each case via a coupling member 4 to the lifting rod 3, wherein the coupling 42 is located between the coupling member 4 and the pivoting lever 23 relative to the associated pivot axis 22 on the side opposing the holding portion 20. Each coupling member 4 is rotatably arranged in each case on a side of the slide element 31 of the lifting rod 3, wherein a rotational axis 40 (see FIG. 3) of the coupling member 4 is oriented perpendicular to the longitudinal axis 30. On the other side of the coupling member 4 the pivoting lever 23 is guided with play on the coupling member 4 in order to prevent jamming.

Moreover, each coupling member 4 comprises an adjusting element which is configured in the present case as an eccentric element 43 for adjusting the pivoting position of the gripping arm. A spacing between the coupling 41 and the coupling 42 may be adjusted via the eccentric element 43.

Figure 4:
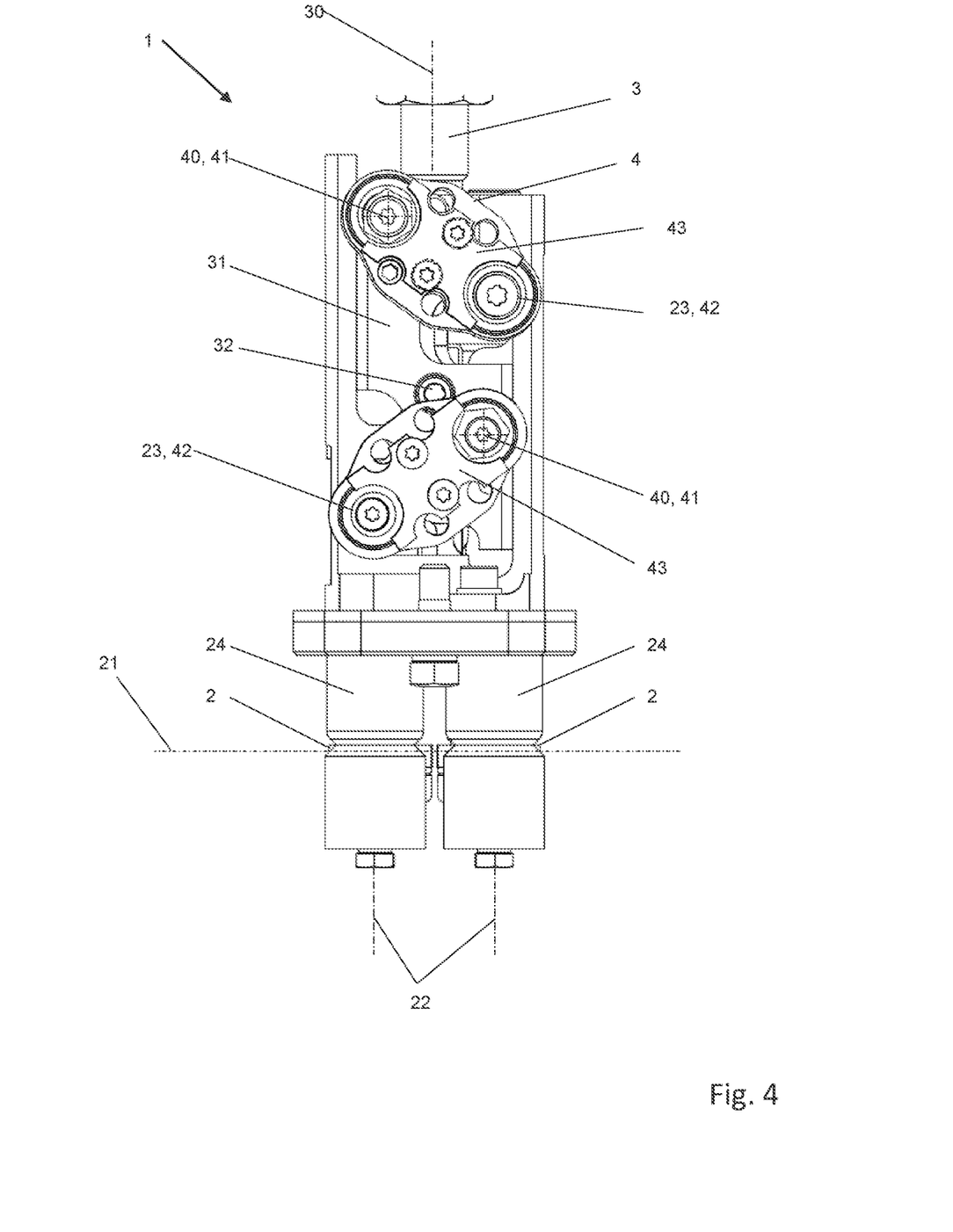
FIG. 4 shows schematically a rear view of the device of FIG. 2.

As may be identified in FIG. 4 which schematically shows a rear view of the device 1 of FIGS. 2 and 3, the coupling 41 is arranged between the coupling member 4 and the slide element 31 above the coupling 42 between the coupling member 4 and pivoting lever 23, wherein the couplings 41, 42 are arranged relative to the pivot axes 22 on a side opposing the holding portions 20. As a result, a displacement of the lifting rod 3 in the direction of gravity g leads to a closing of the gripping arms 2.

Figure 5:
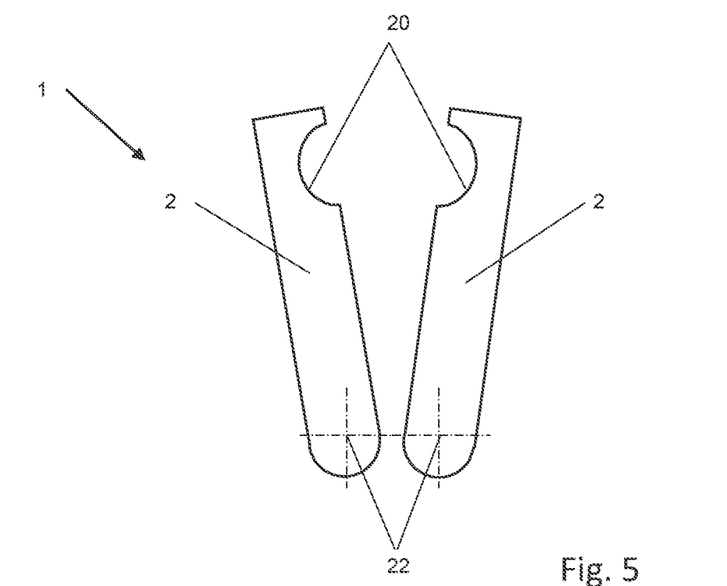
FIG. 5 shows schematically a pair of gripping arms of the device of FIG. 2 in an open state.
Figure 6:
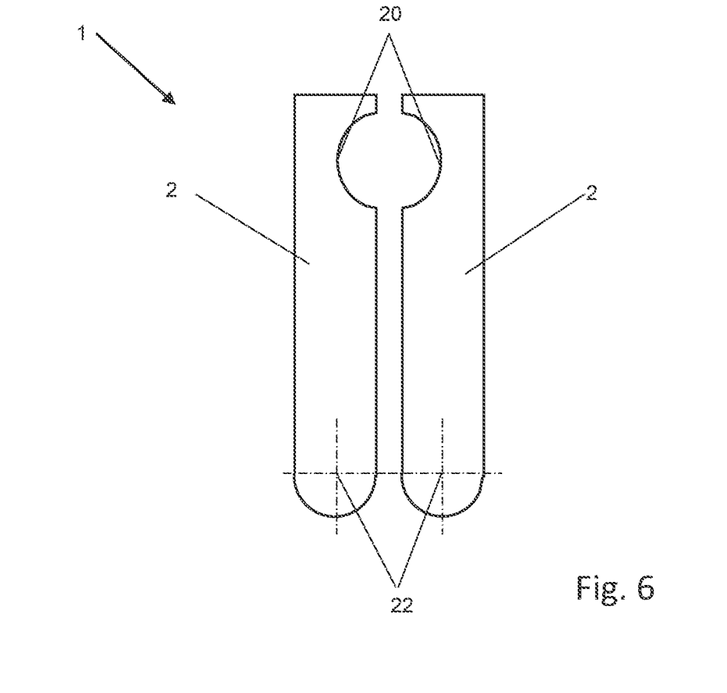
FIG. 6 shows schematically the pair of gripping arms of FIG. 5 in a closed state.

A pair of gripping arms 2 of the device 1 in an open state is shown schematically in FIG. 5, and the pair of gripping arms of FIG. 5 in a closed state is shown schematically in FIG. 6.

Figure 7:
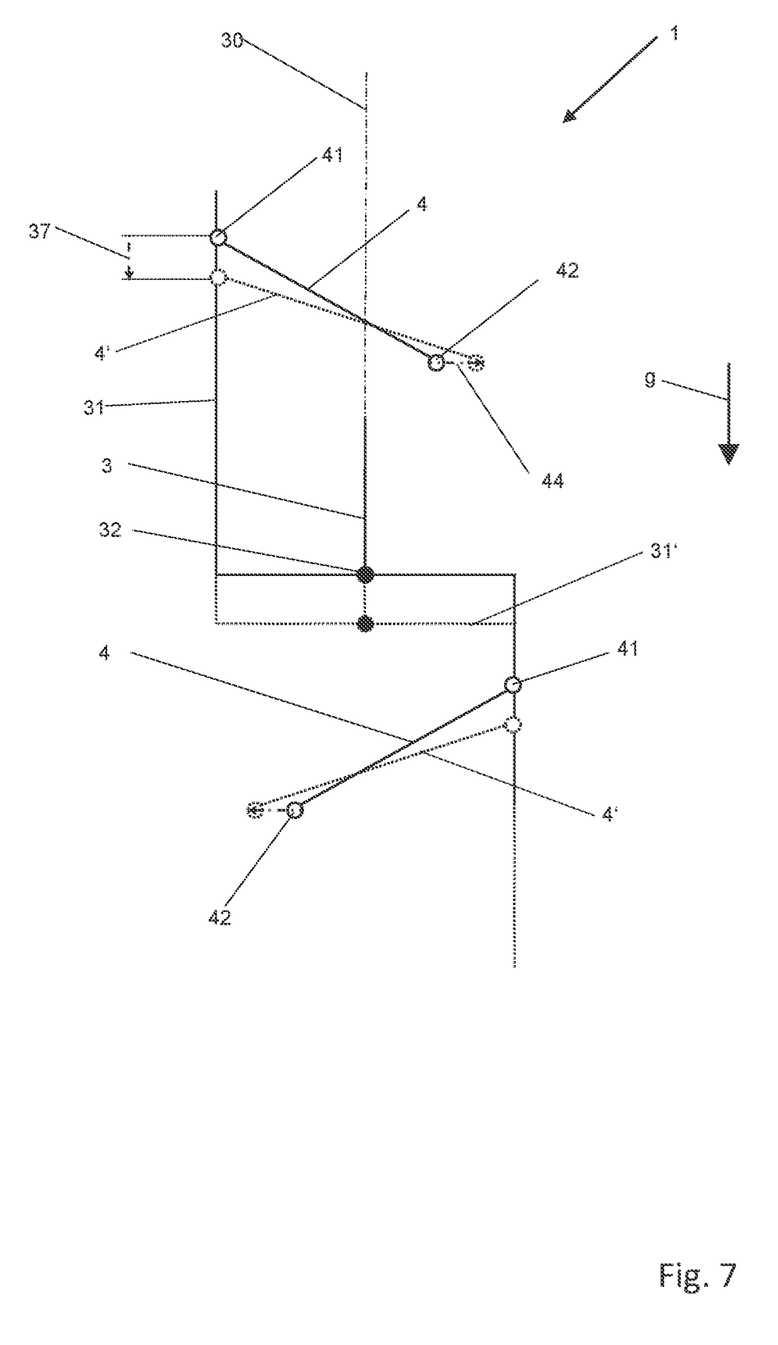
FIG. 7 shows schematically a functional diagram of the device of FIG. 1.

FIG. 7 shows schematically a functional diagram of the device 1 of FIGS. 2 to 4, wherein the lifting rod 3 together with the S-shaped slide element 31 and the coupling members 4 with their couplings 41, 42 are shown by solid lines in an upper position, viewed in the direction of gravity g. The position thereof which they adopt when the lifting rod 3 has been displaced by a predetermined displacement 37 is indicated by means of dashed lines. A corresponding offset 44 of the coupling 42 outwardly perpendicular to the longitudinal axis 30 is implemented by the displacement 37. The pivoting lever 23 which is coupled by the coupling member 4 to the coupling 42 is subjected to a pivoting movement which corresponds to the offset 44 and which is transmitted thereby to the respective gripping arm 2.

Due to the arrangement of the coupling 41 above the coupling 42, the gripping arms 2 are closed by the lifting rod 3 being moved downwardly.

Figure 8:
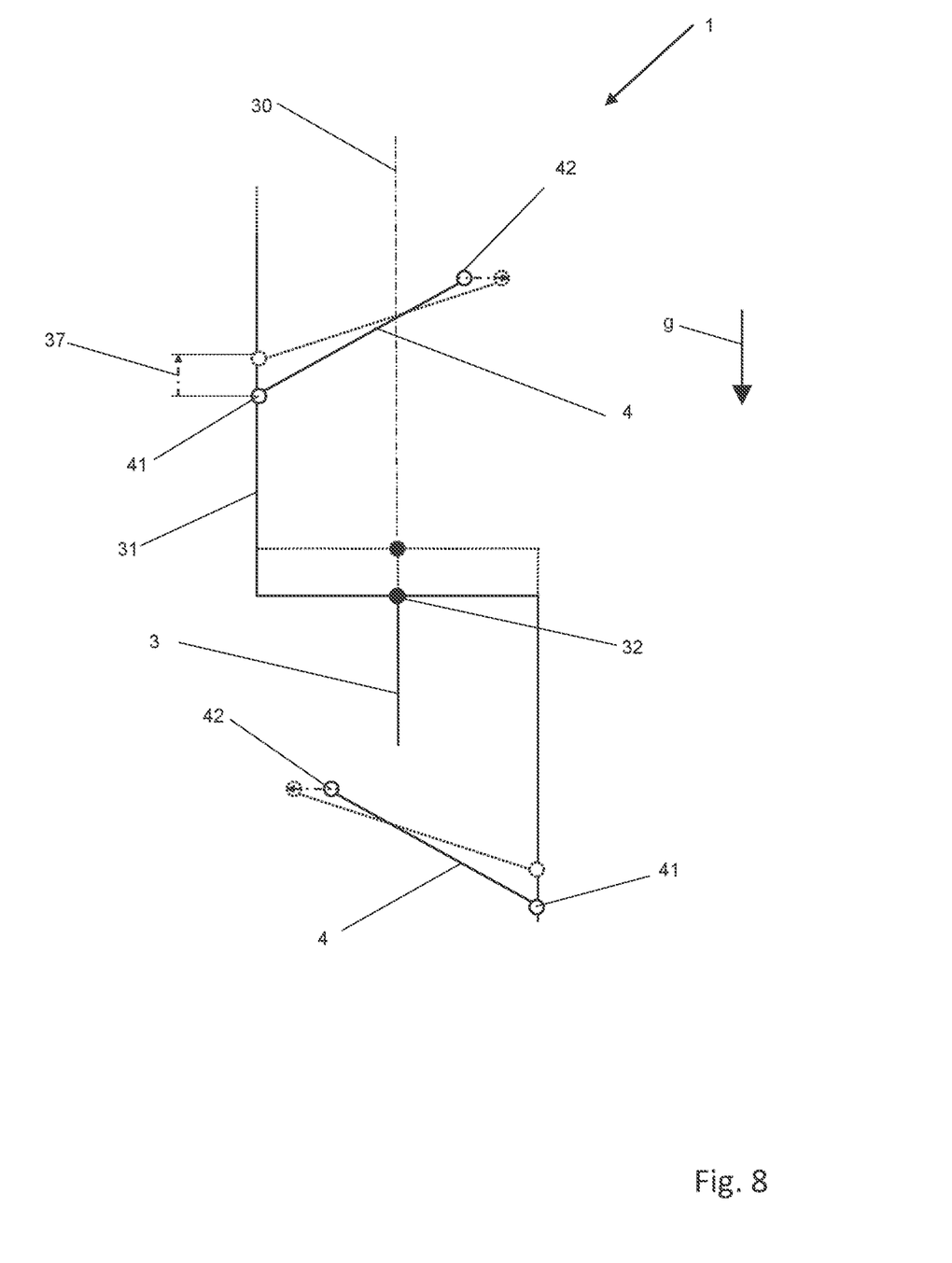
FIG. 8 shows schematically a functional diagram of a further device for holding a container.

FIG. 8 shows schematically a functional diagram of a further device 1 for holding a container. The device 1 substantially corresponds to that of FIG. 7, wherein here the couplings 41 are arranged below the couplings 42. Accordingly, the gripping arms 2 are closed by lifting the lifting rod 3, thus a displacement 37 counter to the direction of gravity g, since the couplings 41, 42 are arranged relative to the pivot axes 22 on a side opposing the holding portions 20.

Figure 9:
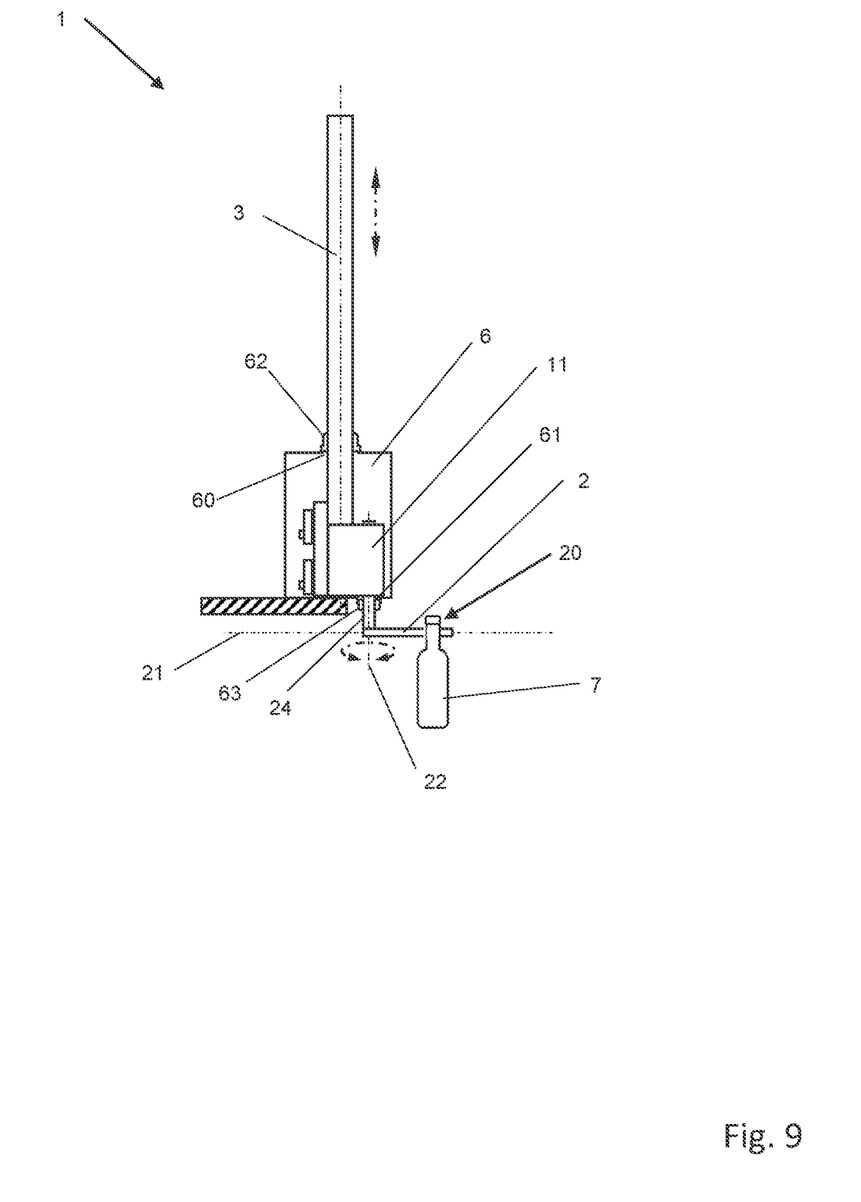
FIG. 9 shows schematically a side view of a further device for holding a container.

A side view of a further device 1 for holding a container 7 is shown schematically in FIG. 9. The device 1 substantially corresponds to that of FIGS. 2 to 4, wherein a coupling housing 6 encloses the slide element 31, the coupling members 4 and the pivoting levers 23.

The lifting rod 3 extends through an opening 60 in the coupling housing 6 which is sealed by means of a seal 62, and the shafts 24 of the gripping arms 2 extend in each case through a bore 61 in the coupling housing 6 which is sealed by means of a seal 63.

The seal 62 in this case is configured to compensate for the required travel of the lifting rod 3 occurring during operation. Moreover, the seal 63 is configured to compensate for the required pivoting movement of the shaft 24 occurring during operation.

If applicable, all of the individual features which are shown in the exemplary embodiments may be combined together and/or replaced without departing from the scope of the invention.

What is claimed is:

1. A device for holding a container in a container treatment device comprising:
two gripping arms that are configured to pivot relative to one another in a pivoting plane, wherein each gripping arm of the two gripping arms comprises a holding portion configured to hold the container; and
a lifting rod system that is coupled to the two gripping arms such that the holding portions of the two gripping arms are configured to pivot relative to one another by a displacement of the lifting rod system perpendicular to the pivoting plane, wherein the lifting rod system is configured to be displaceable along a longitudinal axis of the lifting rod system, and the longitudinal axis of the lifting rod system is perpendicular to the pivoting plane wherein the lifting rod system comprises two rod elements that are configured to be displaced relative to one another in a direction of the longitudinal axis of the lifting rod system, and the rod elements are coupled via a spring element in the direction of the longitudinal axis.

2. The device of claim 1, wherein the two gripping arms are pivotably arranged about a common pivot axis, or the two gripping arms each have a separate pivot axis about which they are pivotably arranged.

3. The device of claim 1, further comprising a coupling member, wherein one of the two gripping arms comprises a pivot lever that is fixedly connected to the one gripping arm, and the pivoting lever is coupled to the lifting rod system via the coupling member.

4. The device of claim 3, wherein:
the coupling member is rotatably arranged on the lifting rod system,
the pivoting lever in its longitudinal direction is displaceably received on the coupling member,
the pivoting lever is received on the coupling member in a rotatable manner relative to the coupling member, or
the coupling member comprises an adjusting element configured to adjust a pivoting position of the one gripping arm.

5. The device of claim 3, wherein the coupling member is rotatably arranged on the lifting rod system, and a rotational axis of the coupling member is oriented perpendicular to the longitudinal axis of the lifting rod system.

6. The device of claim 3, wherein the lifting rod system comprises a slide element, and the coupling member is coupled to the lifting rod via the slide element.

7. The device of claim 6, wherein:
the coupling member is coupled on one side to the slide element and coupled on another side to the pivoting lever, or
the slide element has an S-shaped configuration and is connected at a central portion to the lifting rod.

8. The device of claim 3, wherein:
coupling of the coupling member to the lifting rod system is arranged in a direction of the longitudinal axis of the lifting rod system above the coupling of the coupling member to the pivoting lever relative to an orientation of the container held by the two gripping arms,
coupling of the coupling member to the lifting rod is arranged in a direction of the longitudinal axis of the lifting rod system below the coupling of the coupling member to the pivoting lever relative to an orientation of the container held by the two gripping arms,
coupling of the coupling member to the lifting rod system is arranged between the pivoting lever and the coupling member, or
coupling of the coupling member to the lifting rod system is arranged between the pivoting lever and the coupling member relative to a pivot axis on a side of the holding portion of the one gripping arm.

9. The device of claim 3, further comprising a coupling housing that encloses the coupling member and the pivoting lever, wherein the lifting rod system extends through a sealed opening in the coupling housing.

10. The device of claim 9, wherein the two gripping arms are each fastened to a shaft configured to pivot about a pivot axis of its respective gripping arm, and the shafts extend through a sealed bore in the coupling housing.

11. The device of claim 1, further comprising two coupling members, wherein each of the two gripping arms comprise a pivot lever that is fixedly connected to its respective gripping arm, and the pivoting levers are coupled to the lifting rod via the two coupling members.

12. The device of claim 1, wherein the two gripping arms are rotatably coupled to one another via two intermeshing gears.

13. The device of claim 1, wherein the lifting rod system on its side opposing the two gripping arms comprises a control unit configured to control a position of the lifting rod system relative to the longitudinal axis of the lifting rod system.

14. The device of claim 13, wherein the control unit comprises:
- a pretensioning element configured to pretension the lifting rod system into a predetermined position, or
- an interaction portion configured to interact with a pre-determining device configured to predetermine a position of the lifting rod system, wherein the interaction portion is in the form of a slide element, a pin, and/or a wheel and is configured to slide and/or roll on a predetermining device configured as a guide curve or a guide groove.

15. The device of claim 1, wherein:
the container treatment device comprises a housing,
the lifting rod system comprises a seal configured to seal the lifting rod system relative to a housing opening of the housing, and
the lifting rod system extends through the housing opening.

16. The device of claim 15, wherein:
the seal is fastened to the lifting rod system,
the seal is configured to be fastened to the housing opening,
the seal is configured to compensate for the displacement of the lifting rod system,
the seal comprises a silicone material, or
the seal is configured as a folding bellows.

17. A container treatment device comprising:
a transport device configured to transport containers, wherein the transport device comprises a device configured to hold a container, the device comprising:
two gripping arms that are configured to pivot relative to one another in a pivoting plane, wherein each gripping arm of the two gripping arms comprises a holding portion configured to hold the container; and
a lifting rod system that is coupled to the two gripping arms such that the holding portions of the two gripping arms are configured to pivot relative to one another by a displacement of the lifting rod system perpendicular to the pivoting plane, wherein the lifting rod system is configured to be displaceable along a longitudinal axis of the lifting rod system, and the longitudinal axis of the lifting rod system is perpendicular to the pivoting plane wherein the lifting rod system comprises two rod elements that are configured to be displaced relative to one another in a direction of the longitudinal axis of the lifting rod system, and the rod elements are coupled via a spring element in the direction of the longitudinal axis.

18. The container treatment device of claim 17, further comprising a housing configured to provide a sealed space.

19. The container treatment device of claim 18, wherein:
the two gripping arms are arranged in an interior of the housing,
the lifting rod system extends through a housing opening,
the lifting rod system comprises a control unit, and
the control unit is arranged outside the housing.

* * * * *

UNITED STATES PATENT AND TRADEMARK OFFICE
CERTIFICATE OF CORRECTION

PATENT NO. : 12,138,760 B2
APPLICATION NO. : 17/337673
DATED : November 12, 2024
INVENTOR(S) : Tobias Ehrismann, Bruno Landler and Markus Schoenfelder It is certified that error appears in the above-identified patent and that said Letters Patent is hereby corrected as shown below:

On the Title Page

Item [57], Line 6, change "lifting rod which" to --lifting rod system which--.

Item [57], Line 9, change "lifting rod perpendicular" to --lifting rod system perpendicular--.

In the Claims

Claim 6, Column 10, Line 30, change "lifting rod via" to --lifting rod system via--.

Claim 7, Column 10, Line 36, change "lifting rod." to --lifting rod system.--.

Claim 8, Column 10, Line 43, change "lifting rod is" to --lifting rod system is--.

Claim 11, Column 10, Line 67, change "lifting rod via" to --lifting rod system via--.

Signed and Sealed this
Twentieth Day of May, 2025

Coke Morgan Stewart
*Acting Director of the United States Patent and Trademark Office*